(12) United States Patent
Kim et al.

(10) Patent No.: US 9,121,981 B2
(45) Date of Patent: Sep. 1, 2015

(54) LIGHT UNIT

(75) Inventors: Jong Sun Kim, Seoul (KR); Sang Jun Park, Seoul (KR); Kyoung Soo Ahn, Seoul (KR); Kyoung Jong Yoo, Seoul (KR); Yong In Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 42 days.

(21) Appl. No.: 13/884,565

(22) PCT Filed: Jul. 15, 2011

(86) PCT No.: PCT/KR2011/005240
§ 371 (c)(1),
(2), (4) Date: May 9, 2013

(87) PCT Pub. No.: WO2012/064007
PCT Pub. Date: May 18, 2012

(65) Prior Publication Data
US 2013/0223096 A1    Aug. 29, 2013

(30) Foreign Application Priority Data

Nov. 10, 2010  (KR) .................. 10-2010-0111234
Nov. 10, 2010  (KR) .................. 10-2010-0111235

(51) Int. Cl.
*F21V 7/04*    (2006.01)
*F21V 8/00*    (2006.01)
*G02F 1/1335*  (2006.01)

(52) U.S. Cl.
CPC .......... *G02B 6/0036* (2013.01); *G02B 6/0021* (2013.01); *G02B 6/0061* (2013.01);
(Continued)

(58) Field of Classification Search
CPC .. G02B 6/0038; G02B 6/0016; G02B 6/0053; G02B 6/0073; G02B 5/045; G02B 5/0242

USPC .................. 362/608, 612, 617, 620
See application file for complete search history.

(56) References Cited

U.S. PATENT DOCUMENTS

| 8,045,093 B2 | 10/2011 | Won et al. |
| 2010/0265694 A1 | 10/2010 | Kim et al. |

FOREIGN PATENT DOCUMENTS

| CN | 101639201 A | 2/2010 |
| JP | 2005-293940 A | 10/2005 |

(Continued)

OTHER PUBLICATIONS

European Search Report dated Apr. 16, 2014 in European Application No. 11840021.

(Continued)

*Primary Examiner* — Meghan Dunwiddie
(74) *Attorney, Agent, or Firm* — Saliwanchik, Lloyd & Eisenschenk

(57) ABSTRACT

The present invention provides a light unit, comprising a printed circuit board equipped with a plurality of LEDs; and a light guide member equipped with mounting grooves to house the LEDs. It is preferred that the light guide member comprises one surface and another surface facing the one surface; a first density pattern area and a second density pattern area having higher density than that of the first density pattern area are formed in the one surface; and the second density pattern is disposed in an area closer to the light emitting surface of the LED than the first density pattern area.
According to the present invention, hot spots can be removed by forming high density optical patterns on the upper surface of a light guide member and diffusing the light of LEDs; meanwhile, the transmission range of light can be extended and light extraction efficiency can be improved by disposing low density optical patterns in adjacent areas.

14 Claims, 4 Drawing Sheets

(52) U.S. Cl.
CPC .... *G02F1/133603* (2013.01); *G02F 1/133606* (2013.01); *G02B 6/0038* (2013.01); *G02F 2001/133607* (2013.01)

(56) References Cited

FOREIGN PATENT DOCUMENTS

| JP | 2006-302687 A | 11/2006 |
|---|---|---|
| JP | 2007-005111 A | 1/2007 |
| JP | 2007-165064 A | 6/2007 |
| JP | 2008-059786 A | 3/2008 |
| KR | 10-2001-0106393 A | 11/2001 |
| KR | 10-2007-0048888 A | 5/2007 |
| KR | 10-2009-0066467 A | 6/2009 |
| KR | 10-2009-0085823 A | 8/2009 |

OTHER PUBLICATIONS

International Search Report in International Application No. PCT/KR2011/005240, filed Jul. 15, 2011.
Office Action dated Mar. 9, 2015 in Chinese Application No. 201180064683.1.

(a)

(b)

(c)

(d)

(a)

(b)

(d)

(c)

(e)

35 ~ 70 degrees
low density: 35 ~ 50 degrees
high density: 50 ~ 70 degrees (f)

(a)  (b)

(c)  (d)

(a)  (b)

(c)  (d)

LIGHT UNIT

CROSS-REFERENCE TO RELATED APPLICATIONS

This application is the U.S. national stage application of International Patent Application No. PCT/KR2011/005240, filed Jul. 15, 2011, which claims priority to Korean Application Nos. 10-2010-0111235, filed Nov. 10, 2010, and 10-2010-0111234, filed Nov. 10, 2010, the disclosures of each of which are incorporated herein by reference in their entirety.

TECHNICAL FIELD

This application claims priorities to Korean Patent Application No. 10-2010-0111234 filed on Nov. 10, 2010 and Korean Patent Application No. 10-2010-0111235 filed on Nov. 10, 2010, all of which are hereby incorporated by reference in its entirety into this application.

The present invention relates to a backlight unit able to reduce and remove hot spots.

BACKGROUND ART

A backlight unit, installed behind LCD which does not produce light itself, illuminates the LCD uniformly to produce a visible display image. A light guide plate is a component realizing brightness and uniform illumination of the backlight unit and passes light emitted from LEDs uniformly across the entire surface of the LCD.

FIG. 1 illustrates the structure of a backlight unit which makes use of the LED as a light source. As shown in the figure, the backlight unit has a plurality of LEDs 20 installed in an upper part of a printed circuit board 10 and has a light guide plate 30 delivering the light emitted from the LED 20 to the upper part. In particular, a plurality of LEDs are used for a light source and attempts are made to have the light emitting surface emit light uniformly across the entire surface. In this case, a plurality of LEDs are disposed on the surface and holes are formed on the light guide plate so that LEDs can be inserted inside the holes.

If LEDs are inserted into the inside the light guide plate, hot spots are generated due to the heat in the surface close to the LEDs. Because of this, the brightness of an area close to the LEDs becomes relatively high and accordingly, brightness specks are formed in that area.

DISCLOSURE OF INVENTION

Technical Problem

The present invention has been made in an effort to provide a backlight unit removing hot spots by forming a high density optical pattern on the upper surface of a light guide plate and diffusing the light of LEDs; and extending the transmission range of light and improving light extraction efficiency by disposing a low density optical pattern in adjacent areas.

Solution to Problem

To solve the technical problems above, the present invention provides a light unit comprising a printed circuit board equipped with a plurality of LEDs; and a light guide member equipped with mounting grooves to house the LEDs, where the light guide member comprises one surface and another surface facing the one surface; a first density pattern area and a second density pattern area having higher density than that of the first density pattern area are formed in the one surface; and the second density pattern area is disposed in an area closer to the light emitting surface of the LED than the first density pattern area.

In particular, the first and the second density pattern area can be formed in such a way that a plurality of protruding patterns of relief structure overlap with each other or are formed independently of each other. Furthermore, the protruding patterns of relief structure can be formed in the shape of polygonal cone pattern or hemisphere type pattern.

On another surface of the light guide member, a third density pattern area and a fourth density pattern area with higher pattern density than the third density pattern area are formed; it is preferred that the third density pattern area is disposed in an area closer to the light emitting surface of the LED than the fourth density pattern area.

The third and the fourth density pattern area can be formed in such a way that patterns of engraving structure overlap with each other or formed independently of each other; the patterns of engraving structure can be formed in the shape of polygonal cone pattern or hemisphere type pattern towards the inside of the light guide member.

In particular, the first to the fourth density pattern area of the structure above are formed in such a way to include raised or depressed polygonal cone patterns; the density can be adjusted so that the lower inclination angle ($\sigma$) of the polygonal cone pattern ranges from 35 to 70 degrees.

The second density pattern area is formed on the surface of the light guide plate lying in a vertical, upward direction from the position where the mounting groove is formed; the second density pattern area can be formed in the area lying within one fifth of a first distance (d1) between the mounting groove and an adjacent mounting groove.

Also, the third density pattern area can be disposed to comprise at least two or more areas.

In addition, the distance between the mounting groove and the LED can be determined to be 100 mm or less.

In particular, the first density pattern area according to the present invention comprises a first optical pattern formed in a first direction of the light guide member or a second optical pattern formed in a second direction of the light guide member; the second density pattern area is made to provide a light unit formed by cross patterns of the first and the second optical pattern.

The second density pattern area can be disposed in an area closer to the light emitting surface of the LED than the first density pattern area.

Moreover, the first optical pattern or the second optical pattern can be formed in such a way that protruding patterns in relief structure are formed in the shape of line. In this case, the protruding patterns in relief structure can be formed in the shape of polygonal cone pattern or hemisphere type line pattern.

Advantageous Effects of Invention

According to the present invention, hot spots can be removed by forming high density optical patterns on the upper surface of a light guide member and diffusing the light of LEDs; meanwhile, the transmission range of light can be extended and light extraction efficiency can be improved by disposing low density optical patterns in adjacent areas.

In particular, by disposing low density optical patterns in the area adjacent to the light emitting unit of LED and high density optical patterns in the area far from the light emitting unit in a lower surface of the light guide member, light extraction efficiency can be improved; and at the same time, light uniformity can be improved.

BRIEF DESCRIPTION OF DRAWINGS

The accompany drawings, which are included to provide a further understanding of this document and are incorporated on and constitute a part of this specification illustrate embodiments of this document and together with the description serve to explain the principles of this document.

BEST MODE FOR CARRYING OUT THE INVENTION

The present invention provides a light unit by adjusting the density of optical patterns of special shape on the upper and lower surface of a light guide member, thereby reducing hot spots formed due to strong illumination of light produced around LED and improving uniformity of light.

To this end, the present invention provides a light unit comprising a printed circuit board equipped with a plurality of LEDs and a light guide member equipped with mounting grooves to house the LEDs, where the light unit comprises one surface and another surface facing the one surface; a first density pattern area and a second density pattern area having higher density than that of the first density pattern area are formed in the one surface; and the second density pattern area is disposed in an area closer to the light emitting surface of the LED than the first density pattern area.

In particular, the first and the second density pattern area can be formed in such a way that a plurality of protruding patterns of relief structure overlap with each other or are formed independently of each other. Furthermore, the protruding patterns of relief structure can be formed in the shape of polygonal cone pattern or hemisphere type pattern. On the other hand, the first density pattern area comprises a first optical pattern formed in a first direction of the light guide member or a second optical pattern formed in a second direction of the light guide member; the second density pattern area is made to provide a light unit formed by cross patterns of the first and the second optical pattern.

In another surface of the light guide member, a third density pattern area and a fourth density pattern area with higher pattern density than the third density pattern area are formed; it is preferred that the third density pattern area is disposed in an area closer to the light emitting surface of the LED than the fourth density pattern area.

MODE FOR THE INVENTION

In what follows, the structure and the operation of the present invention are described in detail with reference to appended drawings. In describing the present invention with reference to the appended drawings, the same reference numbers are assigned to the same constituting elements irrespective of figure number and the corresponding descriptions are omitted. The terms including first, second, and so on can be used for describing various constituting elements, but the constituting elements should not be limited to those terms. The terms are used only for differentiating one constituting element from the other elements.

Figure 1:
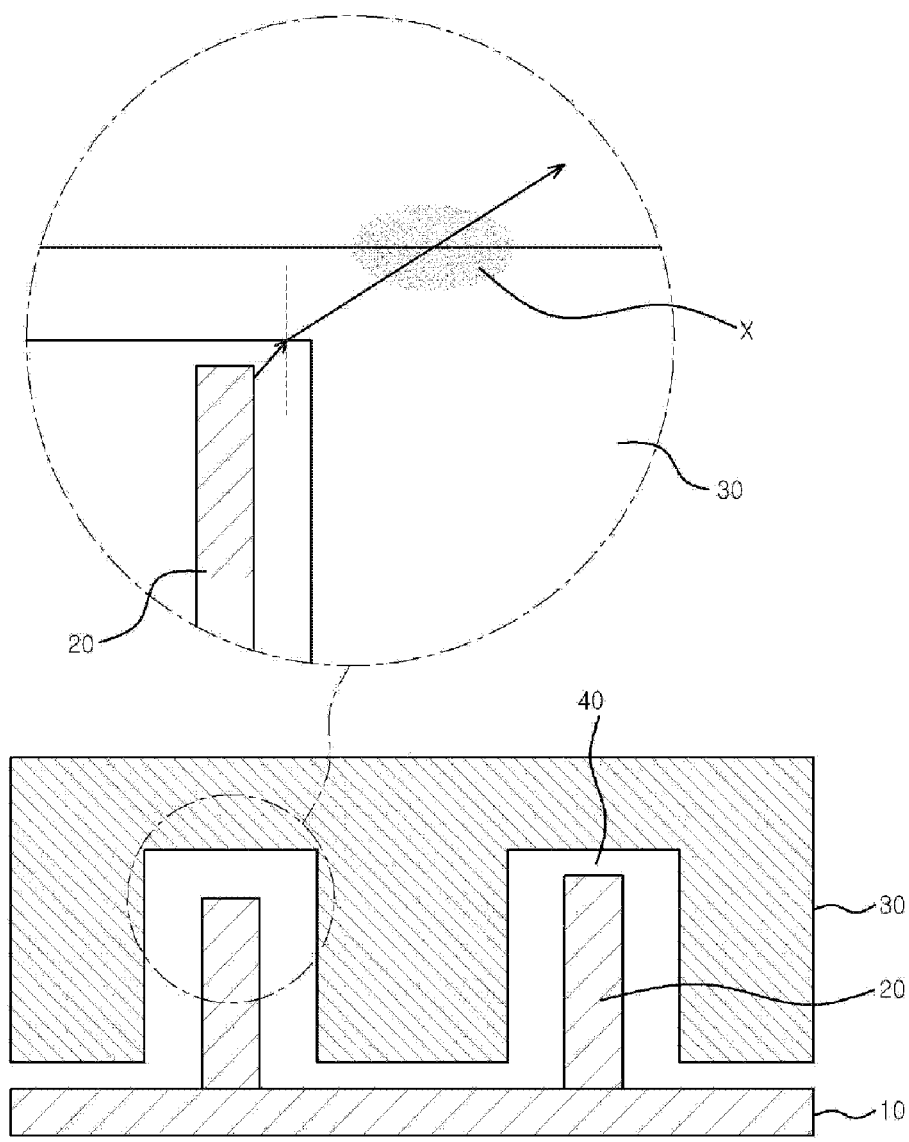
FIG. 1 illustrates the structure of a light unit which uses LED as a light source.
Figure 2:
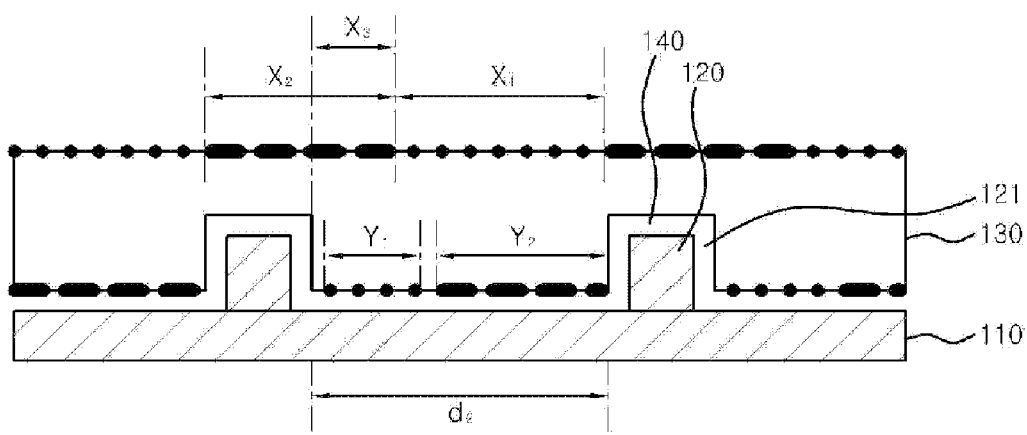
FIG. 2 is the conceptual, cross-sectional view illustrating the structure of a light unit according to the present invention.

FIG. 2 is the conceptual, cross-sectional view illustrating the structure of a light unit according to the present invention.

(1) First Embodiment

A First and a Second Density Pattern Area Formed on the Upper Surface of a Light Guide Member As shown in the figure, a light unit according to the present invention comprises a printed circuit board 110 equipped with a plurality of LEDs 120 and a light guide member 130 equipped with mounting grooves 140 to house the LEDs 120, where one surface or another surface of the light guide member has optical pattern areas, the density of which has been adjusted. The LED 120 can be a side view LED, the light emitting surface 121 of which is installed in the direction of a side wall of the mounting groove 140. In other words, the LED 120 can employ a light source with the structure of emitting light in the direction of a side wall rather than in the upward direction. It is preferred that the distance (d) between the mounting groove 140 and the LED is determined to be 100 mm or less.

In other words, the light unit 130 according to the present invention comprises one surface and another surface facing the one surface; and a first density pattern area X1 and a second density pattern area X2 having higher density than that of the first density pattern area are formed in the one surface of the light guide member 130. In particular, it is preferred that the second density pattern area is disposed in an area closer to the light emitting surface of the LED than the first density pattern area.

The optical patterns comprising the first and the second density pattern area X1, X2 can be formed in such a way that a plurality of protruding patterns of relief structure overlap with each other or are formed independently of each other. For example, optical patterns in the second density pattern area X2 should be formed in such a way to have higher density than that of the first density pattern area X1; the higher density can be achieved by controlling the density of the optical patterns by forming a plurality of the protruding patterns in relief structure with a smaller space between neighboring patterns or forming part of the protruding patterns to overlap with each other.

In particular, it is preferred that the second density pattern area X2 is disposed in an area closer to the light emitting surface of the LED than the first density pattern area X1. In other words, it is preferred that the second density pattern area X2 is formed to be closer to the light emitting surface of the LED light source, while the first density pattern area X1 is formed to be far from the light emitting surface of the LED light source. Since the second density pattern area X2 formed on the upper surface of the light guide member is realized by the disposition of patterns in high density or by overlapping patterns; and by disposing the second density pattern area X2 close to the light emitting surface of the LED light source, much of strong, incident light is diffused or scattered, an effect of reducing hot spots can be achieved. Besides, it is preferred that the second density pattern area X2 is formed on the surface of the light guide member lying in a vertical, upward direction from the position where the mounting groove is formed; and the second density pattern area is formed in the area lying within one fifth of a first distance (d1) between the mounting groove and an adjacent mounting groove. More preferably, a limit point of forming the second density pattern is formed within the distance X3 of 10 mm from the light emitting surface of the LED, thereby preventing generation of hot spots.

On the other hand, the density of patterns of the first density pattern area X1 in the upper surface of the light guide member is lowered by assuming a single structure where the protruding patterns in relief structure are formed independently of each other; thus, since the function of transmitting emitted light long-distance and the extraction efficiency of light are improved, uniformity of light can be improved.

(2) Second Embodiment

A Third and a Fourth Density Pattern Area Formed on the Lower Surface of a Light Guide Member In addition to the embodiment described in detail with reference to FIG. 2, an embodiment according to the present invention can realize an optical pattern on another surface facing one surface of a light guide member. In particular, the optical pattern formed on another surface of the light guide member, too, can be realized in the form of overlapping structure comprising optical patterns of independent shape or independent structure; however, it is preferred that the optical pattern is formed directly on the light guide member in the form of engraving structure.

In other words, it is preferred that the optical pattern is formed on another surface (lower surface) of the light guide member 130 and at the same time, the optical pattern is formed on the surface of an area without mounting grooves.

More specifically, on another surface of the light guide member 130, a third density pattern area Y1 and a fourth density pattern area Y2 with higher pattern density than the third density pattern area are formed; in particular, it is preferred that the third density pattern area is disposed in an area closer to the light emitting surface of the LED than the fourth density pattern area. In this case, the third and the fourth density pattern area can be formed in such a way that patterns of engraving structure overlap with each other or are formed independently of each other.

In other words, the third and the fourth density pattern area of the light guide member 130 can be formed in such a way that various forms of cross-sectional shapes (semi-circle, ellipse, irregular shape, and so on) with engraving structure are formed in the direction of the inside of the light guide member. In one embodiment according to the present invention, a polygonal cone pattern or a hemisphere type pattern can be formed.

In particular, since the third density pattern area Y1 improves the extraction efficiency of light emitted from the LED, thereby improving uniformity of light, while the fourth density pattern area Y2 is realized with optical patterns of relatively higher density than the third density pattern area so that diffusion and scattering of light are improved.

Figure 3:
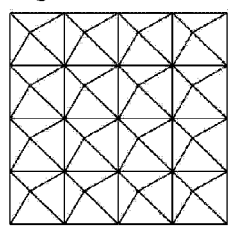
FIG. 3 illustrates examples of an optical pattern according to the present invention.
Figure 3:
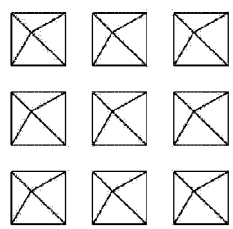
Figure 3:
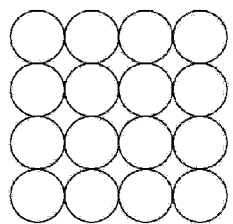
Figure 3:
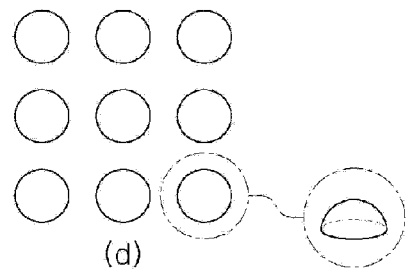

FIG. 3 illustrates examples of an optical pattern formed in the upper surface (one surface) of the light guide member described in FIG. 2.

As shown in the figure, FIGS. 3(a) and (b) realize the optical patterns of protruding structure in the form of polygonal cone pattern; (a) illustrates a structure where optical patterns of quadrangular cone shape are disposed densely, while (b) illustrates an example where the density of optical patterns has been controlled by disposing the optical patterns with a larger space between neighboring patterns. In particular, (a) illustrates an example where part of individual quadrangular cone pattern overlaps with each other, increasing the density of the optical patterns a lot more.

FIGS. 3(c) and (d) illustrate a disposition of hemisphere type patterns; (c) illustrates optical patterns more densely disposed, while (d) illustrates the disposition of optical patterns with low density, separated more from each other. In the latter case, too, the density of optical patterns can be increased by disposing part of individual hemisphere type patterns to overlap with each other in the same way as (c). At this time, the hemisphere type pattern according to the present invention refers to the concept comprising a semi-ellipse pattern and various three-dimensional patterns without a sharp edge as well as the hemisphere type pattern.

Figure 4:
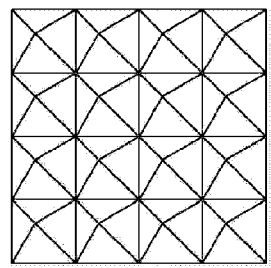
FIG. 4 illustrates examples of polygonal cone patterns realizing an optical pattern of a light guide member according to the present invention.
Figure 4:
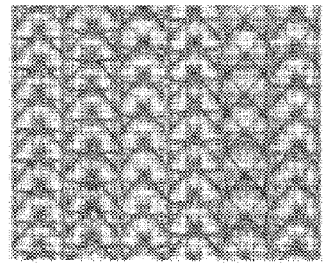
Figure 4:
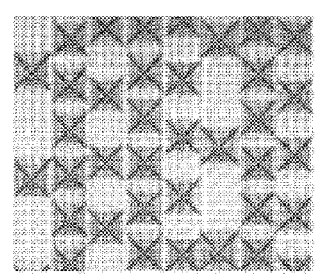
Figure 4:
Figure 4:
Figure 4:
Figure 4:
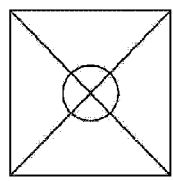
Figure 4:
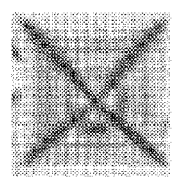
Figure 4:
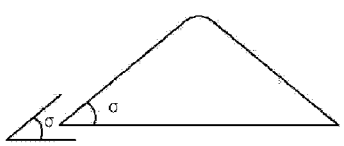

FIG. 4 illustrates actual images of protruding patterns in relief structure of FIG. 3; (b) illustrates the image of disposition of patterns forming a more compact structure by printing the quadrangular cone patterns shown in (a) to overlap with each other, while (d) illustrates the actual image of (c). As described earlier, it should be noted that such patterns can be formed on the lower surface of the light guide member by engraving the patterns.

In particular, in the case of (f), if patterns of raised or depressed polygonal cone shape as shown in (e) are taken into account, the lower inclination angle ($\sigma$) of the polygonal cone pattern ranges from 15 to 80 degrees. More preferably, by making the lower inclination angle ($\sigma$) of the polygonal cone pattern range from 35 to 70 degrees, the density of optical patterns can be controlled. When the inclination angle is under 15 degrees, efficiency is decreased as the amount of light extracted gets small, while if the angle is over 80 degrees, reliability is decreased since the inclination angle of the optical pattern becomes too large. In particular, in the range of 35 to 70 degrees, the extraction efficiency of light is maximized and the reliability is also secured.

For example, in the case of quadrangular cone pattern, the patterns are formed to have the inclination angle of 35 to 50 degrees for low density disposition, while the patterns are formed to have the inclination angle of 50 to 70 degrees for high density disposition.

(3) Third Embodiment

A First and a Second Density Pattern Area Formed on the Upper Surface of a Light Guide Member—Forming a Line Pattern and a Cross Pattern In what follows, another embodiment of the first and the second density pattern area implemented in the first embodiment is described.

Figure 5:
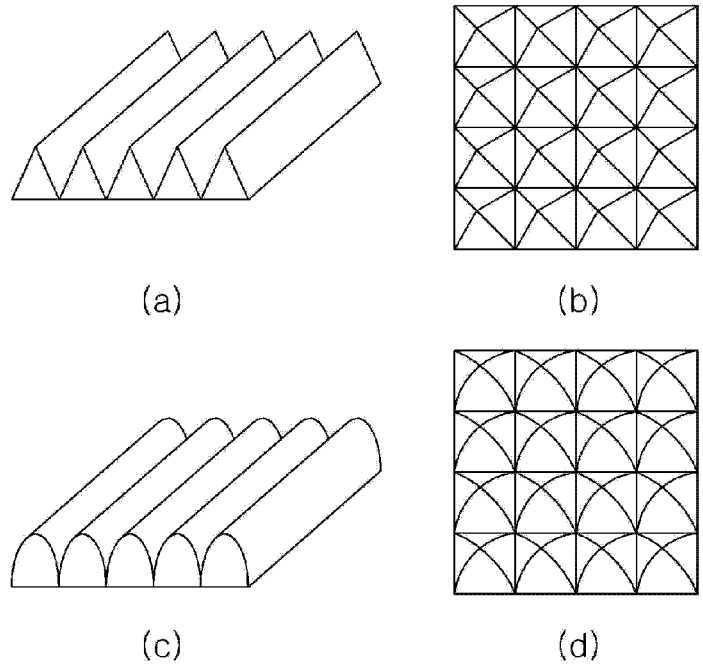
FIG. 5 illustrates one example of an optical pattern according to the present invention.

With reference to FIGS. 2 and 5, a light unit according to the third embodiment comprises a printed circuit board 110 equipped with a plurality of LEDs 120; and a light guide member 130 equipped with mounting grooves 140 to house the LEDs 120, where one surface or another surface of the light guide member has an area of optical patterns, the density of which has been adjusted. The LED 120 can be a side view LED, the light emitting surface 121 of which is installed in the direction of a side wall of the mounting groove 140. In other words, the LED 120 can employ a light source 130 with the structure of emitting light in the direction of a side wall rather than in the upward direction. It is preferred that the distance (d) between the mounting groove 140 and the LED is determined to be 100 mm or less.

In other words, the light guide member 130 according to the present invention comprises one surface and another surface facing the one surface; a first density pattern area X1 and a second density pattern area X2 having higher density than that of the first density pattern area are formed in the one surface of the light guide member. In this case, the first density pattern area X1 comprises a first optical pattern formed in a first direction of the light guide member or a second optical pattern formed in a second direction of the light guide member, while the second density pattern area X2 comprises a cross pattern of the first and the second optical pattern. At this time, the cross pattern indicates that the optical patterns are formed as optical patterns of line shape formed in the first or in the second direction representing the horizontal or the vertical direction of the light guide member cross each other.

In other words, one surface of the light guide member 130 of the present invention, the upper surface in the embodiment illustrated has a structure comprising a pattern area of high density (the second density pattern area) and a pattern area of low density (the first density pattern area). Each of the first and the second density pattern area is implemented by optical patterns of line shape in the horizontal or vertical direction of the light guide member; in particular, the second density pattern area is formed by cross patterns, achieving optical patterns of high density.

In particular, the first and the second optical pattern according to the present invention can be formed in such a way that protruding patterns in relief structure are arranged in the form of line shape in the horizontal or vertical direction of the light guide member (which is defined as 'line pattern' in the present invention). As shown in FIG. 5, the protruding pattern (line pattern) in relief structure can be realized in the form of polygonal cone line pattern or semi-sphere type line pattern, the vertical cross-sectional shape of which is a polygon or a semi-circle.

In addition, it is preferred that the second density pattern area is disposed in an area close to the light emitting surface of the LED. In other words, it is preferred that the second density pattern area X2 is formed to be closer to the light emitting surface of the LED light source, while the first density pattern area X1 is formed to be far from the light emitting surface of the LED light source. Since the second density pattern area X2 formed on the upper surface of the light guide member is realized by the disposition of cross patterns in high density; and by disposing the second density pattern area X2 close to the light emitting surface of the LED light source, much of strong, incident light is diffused or scattered, an effect of reducing hot spots can be achieved.

In particular, it is preferred that the second density pattern area X2 is formed on the surface of the light guide member lying in a vertical, upward direction from the position where the mounting groove is formed; and the second density pattern area is formed in the area lying within one fifth of a first distance (d1) between the mounting groove and an adjacent mounting groove. More preferably, a limit point of forming the second density pattern is formed within the distance X3 of 10 mm from the light emitting surface of the LED, thereby preventing generation of hot spots.

On the other hand, the density of patterns of the first density pattern area X1 in the upper surface of the light guide member is lowered by forming the first or the second optical pattern into a single structure rather than a cross structure; thus, since the function of transmitting emitted light long-distance and the extraction efficiency of light are improved, uniformity of light can be improved.

Along with the third embodiment described above, the third and the fourth density pattern area described in the second embodiment can be formed in such a way that various forms of cross-sectional shapes (semi-circle, ellipse, irregular shape, and so on) with engraving structure are formed in the direction of the inside of the light guide member.

FIG. 5 illustrates one example of a line pattern and a cross pattern formed in the upper surface (one surface) of the light guide member.

As shown in the figure, FIGS. 5(*a*) and (*c*) illustrate examples of the 'line pattern' according to the present invention; (a) illustrates a prism line pattern, while (c) a semi-circle line pattern. As described above, the line pattern indicates that optical patterns of line shape are formed in a first or a second direction of the light guide member; according to the cross-sectional shape of the line pattern, various optical patterns such as a polygonal line pattern, a semi-circular line pattern, an elliptical line pattern, and a prism line pattern (triangular line pattern) can be formed.

FIGS. 5(*b*) and (*d*) illustrate examples of cross pattern formed by the first and the second optical pattern according to the present invention; (b) illustrates a cross pattern formed by the cross structure of the prism line pattern of (a), while (d) by the cross structure of the semi-circular line pattern of (c). Therefore, the cross pattern of the present invention can be formed in various ways according to the shape structure of the first or the second optical pattern; for example, the cross pattern can be obtained in the form of the cross structure of (a) and (c).

Figure 6:
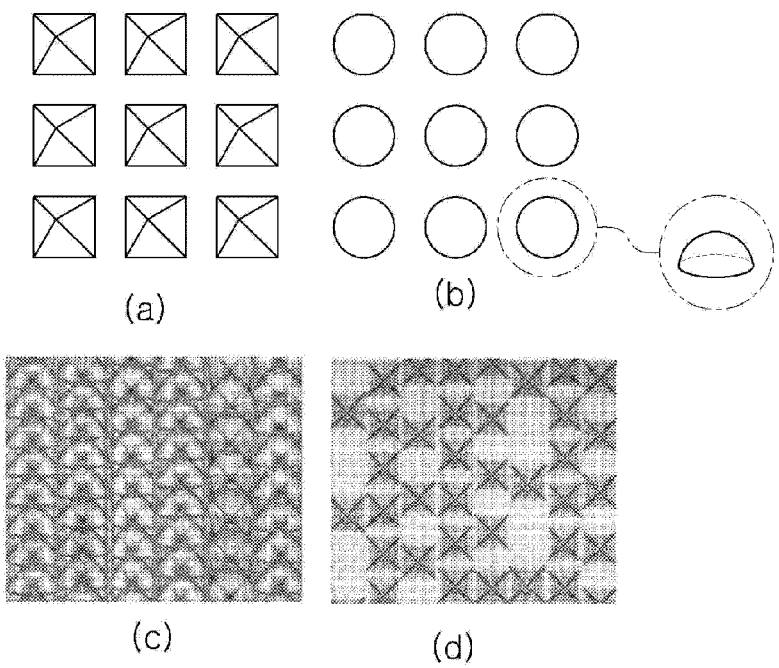
FIG. 6 illustrates the shape of an optical pattern formed in the lower surface of the light guide member according to the present invention.

FIG. 6 illustrates the shape of an optical pattern formed in the lower surface of the light guide member according to the present invention, illustrating an independent pattern shape such as a polygonal cone pattern or a hemisphere type pattern with engraving structure in the direction of the inside of the light guide member.

FIG. 6(*a*) illustrates an example of a polygonal cone pattern, where an pattern shape of quadrangular cone type is formed with engraving structure in the direction of the inside of the light guide member; FIG. 6(*b*) illustrates the example of a hemisphere type pattern, where the hemisphere type pattern is formed with engraving structure in the direction of the inside of the light guide member.

In particular, such patterns can have different density according to how they are disposed, where the density of the optical patterns can be increased by forming part of the optical patterns with the structure shown in FIG. 6(*a*) or (*b*) to overlap with each other. FIG. 6(*c*) is an actual image of polygonal cone patterns shown in (a), illustrating the structure where part of quadrangular cones overlap with each other, while FIG. 6(*d*) illustrates a structure where the density of optical patterns has been decreased by disposing the polygonal cone patterns independently with a predetermined separation distance between neighboring optical patterns.

Figure 7:
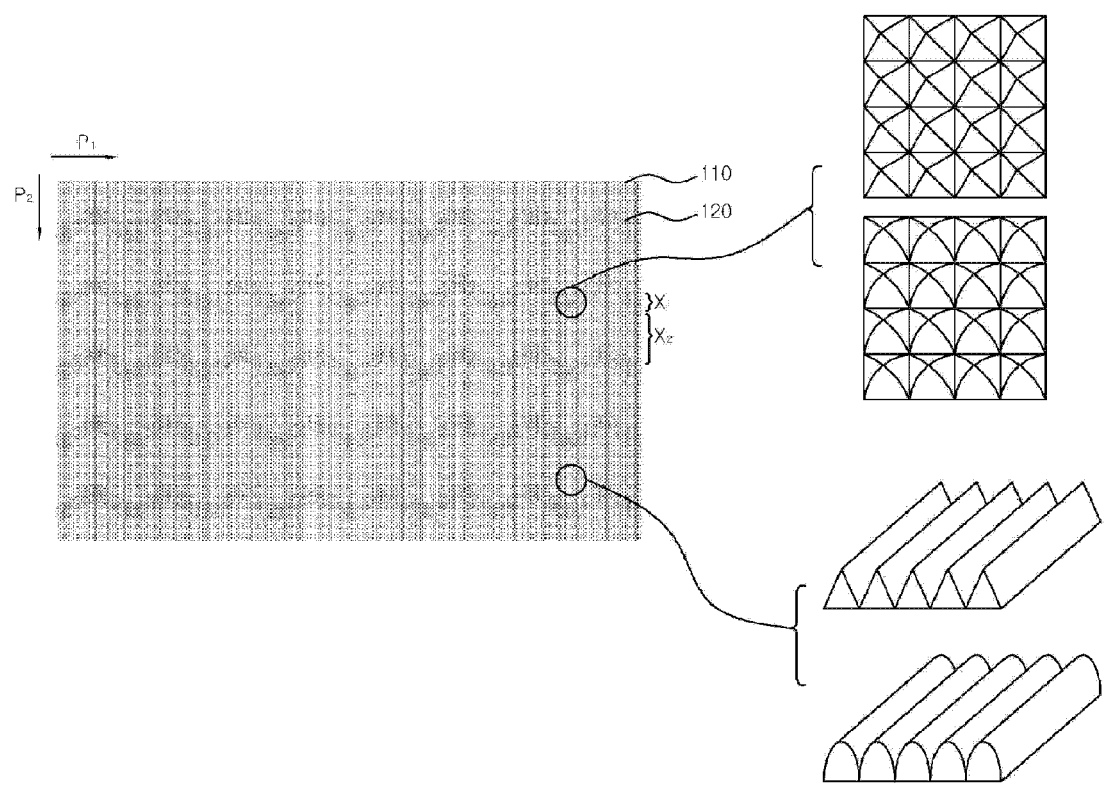
FIG. 7 illustrates the upper plan view of an example where an optical pattern is formed in the light unit according to the present invention.

FIG. 7 illustrates the upper plan view of an example where an optical pattern is formed in the light unit according to the present invention.

With reference to the figure, in the structure where a plurality of LEDs 120 are mounted in the inside of the light guide member 110, if a first direction P1 and a second direction P2 of the upper surface of the light guide member are taken into account, the second density pattern area X2 can be implemented by cross patterns formed as the first optical pattern formed in the first direction P1 and the second optical pattern formed in the second direction P2 cross each other. In other words, as shown in the figure, if the first or the second optical pattern corresponds to a prism type pattern or a semi-circular line pattern, cross patterns of various types of structure can be formed.

Also, the second density pattern area X2 can be implemented as the area where the first or the second optical pattern is made of a single pattern rather than a cross pattern. In other words, the second density pattern area X2 can be formed by either of the prism type pattern or the semi-circular line pattern.

As described above, specific embodiments have been described in the detailed description of the present invention. However, various modifications are possible without departing from the scope of the present invention. The technical principles of the present invention should not be limited to the embodiments of the present invention described above, but the technical principles should be determined not only by what are defined by the appended claims but also the equivalent thereof.

The invention claimed is:

1. A light unit, comprising:
   a printed circuit board equipped with a plurality of LEDs; and
   a light guide member equipped with mounting grooves to house the LEDs, the light guide member comprising one surface and another surface facing the one surface;
   a first density pattern area and a second density pattern area having higher density than that of the first density pattern area being formed in the one surface; and
   the second density pattern being disposed in an area closer to the light emitting surface of the LED than is the first density pattern area,
   wherein on another surface of the light guide member, a third density pattern area and a fourth density pattern area with higher pattern density than the third density pattern area are formed; and the third density pattern area is disposed in an area closer to the light emitting surface of the LED than is the fourth density pattern area.

2. The light unit of claim 1, wherein the first and the second density pattern area are formed as a plurality of protruding patterns in relief structure overlap with each other or are separated from each other.

3. The light unit of claim 2, wherein the protruding pattern in relief structure is polygonal cone pattern or hemisphere type pattern.

4. The light unit of claim 1, wherein the first density pattern area is formed by a first optical pattern formed in a first direction of the light guide member or a second optical pattern formed in a second direction of the light guide member; and the second density pattern area is formed by cross pattern of the first and the second optical pattern.

5. The light unit of claim 4, wherein the first or the second optical pattern is formed as protruding pattern in relief structure is formed in the shape of line.

6. The light unit of claim 5, wherein the protruding pattern in relief structure is polygonal cone line pattern or hemisphere type line pattern.

7. The light unit of claim 1, wherein the third and the fourth density pattern area are formed in such a way that patterns of engraving structure overlap with each other or are formed independently of each other.

8. The light unit of claim 7, wherein the patterns of engraving structure are formed in the shape of polygonal cone pattern or hemisphere type pattern towards the inside of the light guide member.

9. The light unit of claim 1, wherein the first to the fourth density pattern area are formed in such a way to include raised or depressed polygonal cone patterns, lower inclination angle ($\sigma$) of the polygonal cone pattern ranging from 35 to 70 degrees.

10. The light unit of claim 1, wherein the first and the second density pattern area comprise polygonal cone patterns in relief structure, the lower inclination angle ($\sigma$) of the polygonal cone pattern comprising the first density pattern area ranging from 35 to 50 degrees, while the lower inclination angle ($\sigma$) of the polygonal cone pattern comprising the second density pattern area ranges from 50 to 70 degrees.

11. The light unit of claim 1, wherein the third and the fourth density pattern area comprise polygonal cone patterns with engraving structure, the lower inclination angle ($\sigma$) of the polygonal cone pattern comprising the third density pattern area ranging from 35 to 50 degrees, while the lower inclination angle ($\sigma$) of the polygonal cone pattern comprising the fourth density pattern area ranges from 50 to 70 degrees.

12. The light unit of claim 1, wherein the second density pattern area is formed on the surface of the light guide member lying in a vertical, upward direction from the position where the mounting groove is formed; the second density pattern area being formed in the area lying within one fifth of a first distance (d1) between the mounting groove and an adjacent mounting groove.

13. The light unit of claim 12, wherein the third density pattern area is disposed to comprise at least two or more areas.

14. The light unit of claim 11, wherein distance between the mounting groove and the LED is determined to be 100 mm or less.

* * * * *